United States Patent [19]

Reichi

[11] Patent Number: 4,477,726
[45] Date of Patent: Oct. 16, 1984

[54] POSITION MEASURING APPARATUS UTILIZING FLEXIBLE STEEL BAND CONTAINING GRID DIVISIONS

[75] Inventor: Alfred Reichi, Stein, Fed. Rep. of Germany

[73] Assignee: Johannes Heidenhain GmbH, Traunreut, Fed. Rep. of Germany

[21] Appl. No.: 305,188

[22] Filed: Sep. 24, 1981

[30] Foreign Application Priority Data

Oct. 14, 1980 [DE] Fed. Rep. of Germany ....... 3038716

[51] Int. Cl.³ .......................... G01B 3/10; G01B 11/02
[52] U.S. Cl. .............................. 250/237 G; 33/125 C; 356/375
[58] Field of Search ........ 250/231 R, 237 G, 231 SE; 356/374, 375, 395; 33/125 C, 125 A, 139

[56] References Cited

U.S. PATENT DOCUMENTS 3,223,845 12/1965 Wales ............................ 250/231 SE
3,742,609 7/1973 Jeannet et al. .
4,063,086 12/1977 Hirose ............................ 250/237 G
4,164,816 8/1979 Bergkvist ................... 250/237 G X
4,172,994 10/1979 Bergkvist ................... 250/237 G X
4,381,609 5/1983 Holstein ............................ 33/125 C

OTHER PUBLICATIONS

Brochure No. 8780-75-879 Distributed by Teledyne Gurley, Troy, N.Y.

Primary Examiner—David C. Nelms
Assistant Examiner—Edward P. Westin
Attorney, Agent, or Firm—Willian Brinks Olds Hofer Gilson & Lione Ltd.

[57] ABSTRACT

A digital electric position measuring apparatus shielded by a flexible covering band. The covering band is held against an elongated carrier body to form a protective seal. A scanning component, movable along the carrier body, lifts the covering band from the carrier body and detects grid divisions upon the underside of the covering band to sense the position of the scanning unit. The covering band passes between the scanning component and a cooperating coupling member to form a seal protecting portions of the scanning component.

12 Claims, 5 Drawing Figures

POSITION MEASURING APPARATUS UTILIZING FLEXIBLE STEEL BAND CONTAINING GRID DIVISIONS

BACKGROUND OF THE INVENTION

The present invention relates to encapsulated digital electric position measuring apparatus and, more particularly, to a position measuring apparatus having a scanning component screened by a flexible covering band.

Digital electric position measuring devices are well-known in incremental and absolute length and angle measurement systems. Such measurement systems include at least one measuring scale having periodic grid divisions which are detectable by a scanning component. The scanning component may use photoelectric, inductive, magnetic, capacitive, or other types of sensors to detect the grid divisions. To avoid interference, especially by fouling of the grid divisions and/or the scanning component, such measurement systems have in the past been tightly encapsulated against dust and spray.

In incremental measurement systems using incident light or transillumination, a known practice to avoid fouling is to provide the grid divisions and portions of the scanning component within an elongated housing which is covered by a flexible steel band to exclude dust and spray. In one zone, the steel band slides over a curved surface of the scanning component projecting from the housing; outside this zone, the steel band is secured to the housing with sealing effect by means of magnetic strips arranged laterally on the housing. (West German DE-PS No. 2 207 374 and West German DE-OS No. 2 642 443.)

In U.S. Pat. No. 3,742,609 and in West German DE-EM 79 22 890, a slide gauge is provided with a flexible covering band which slides over the scanning component. The covering band is held against the portion of the carrier of the measuring scale to be shielded by tension on the covering band and by guides on a movable slide block.

A further known practice in encapsulated incremental position measurement systems is to house the grid divisions and portions of the scanning component within an elongated housing which is covered by a circulating flexible steel band guided in a groove. In such systems, the ends of the circulating steel band are fastened to the scanning component. Upon moving the scanning component along the carrier body, the steel band is circulated over rollers that are provided at the ends of the housing. (Teledyne Gurley Company publication "Pathfinder", No. 8780-75-879.)

Circulating, endless band-type coverings of steel or plastic have already become known in slide gauges for the purpose of protecting portions of the measuring scale. (West German DE-OS No. 1 806 935.)

Known encapsulated position measurement systems are expensive, especially due to the construction required to position the grid divisions, scanning component, and covering band in proper relationship. Also, measurement systems encapsulated in such a manner are often difficult to accomodate in applications having tight space limitations. It is, therefore, a general object of the present invention to provide an encapsulated digital electric position measuring apparatus having a simple and economical construction and wide versatility.

SUMMARY OF THE INVENTION

The present invention is directed to an encapsulated digital electric position measuring apparatus which includes a carrier body and a scanning component positioned adjacent the carrier body. A flexible covering band lies longitudinally on the carrier body and over a portion of the scanning component, such that the covering band screens portions of the scanning component to protect portions of the measuring apparatus from environmental influences. The covering band includes grid divisions which are scanned by the scanning component.

As a result of the present invention, an encapsulated digital electric position measuring apparatus can be manufactured economically with a simplified construction. Unlike the prior art measuring devices discussed above, a separate division carrier is not required, thereby providing the advantages of simpler assembly and a flatter construction. Accordingly, measurement systems equipped with the present invention can be usd in applications having tighter space limitations than prior art measurement systems.

The measuring apparatus of the present invention may include sealing of the covering band by magnetic action, by tension applied to the ends of the covering band, by grooves in the carrier body, or by other means. Also, the grid divisions may be located within a particular zone of the covering band so as to be free of direct contact with other elements of the measuring apparatus. Additionally, the invention may be used in position measurement systems which include a circulating flexible covering band.

The present invention is applicable, further, in inductive, capacitive, and magnetic as well as photo-electric measurement systems. In photo-electric measurement systems, the grid divisions may be illuminated by a light source screened by the covering band. Alternatively, the grid divisions may be applied to a transparent portion of the covering band to permit illumination of the grid divisions by a light source located outside the portion of the scanning component screened by the covering band.

Further objects, features, and advantages of the present invention will become apparent from a consideration of the following description, the appended claims and the accompanying drawings.

DESCRIPTION OF THE PREFERRED EMBODIMENT

Figure 1:
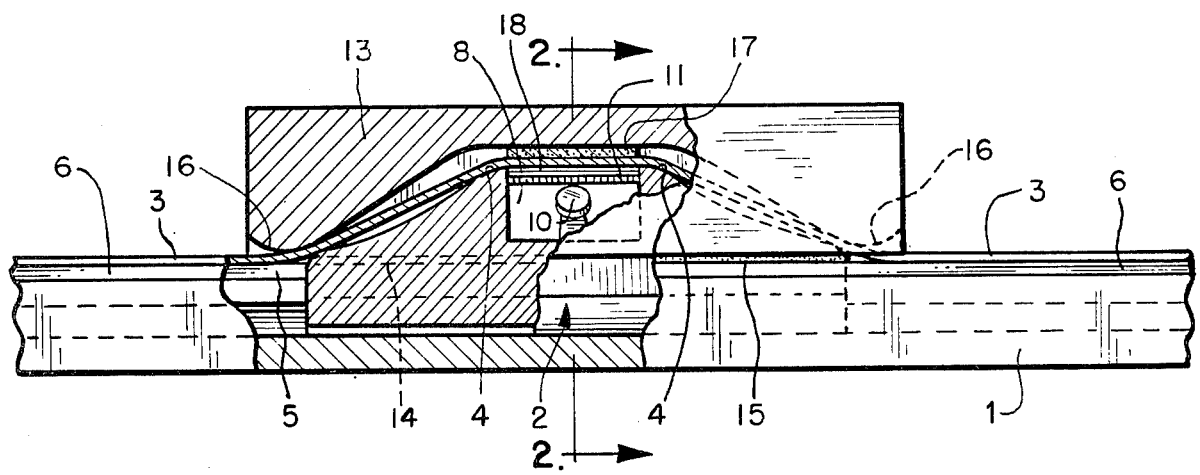
FIG. 1 is a side elevational view of the position measuring apparatus of one preferred embodiment of the present invention with portions broken away.
Figure 2:
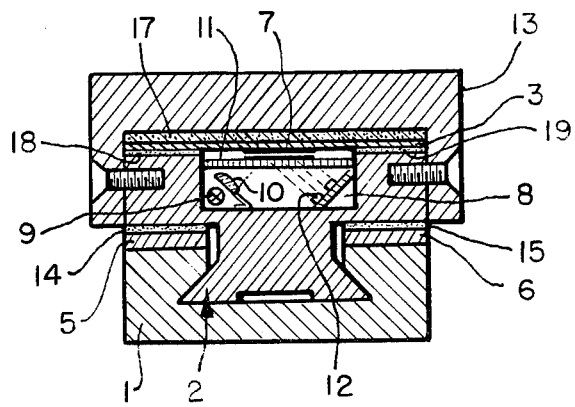
FIG. 2 is a sectional view of the position measuring apparatus taken along the line 2—2 of FIG. 1.
Figure 3:
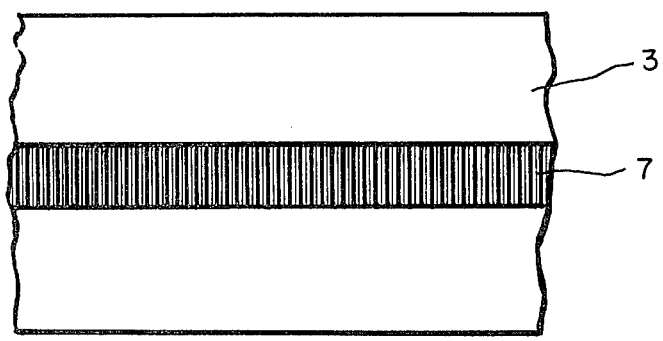
FIG. 3 is a bottom view of the covering band of the position measuring apparatus of FIG. 1.

With reference to the drawings, the position measuring apparatus of the present invention is illustrated in FIGS. 1 and 2 in conjunction with an encapsulated incident light length measurement system. A scanning component, designated generally at 2, is guided along a rigid, generally U-shaped carrier body 1 by means of dovetail guide means. The scanning component 2 includes a dovetail tenon extending downward into a mortise-shaped guideway within the carrier body 1 to provide guided longitudinal sliding therebetween. The carrier body 1 may be expediently extruded of aluminum.

A flexible steel band 3, of high length-constancy, is used to cover the sensitive parts of the measurement system. The steel band 3 slides with respect to the scanning component 2 over a surface 4 which is curved at least in sections. On the surface 4 facing the steel band 3, there are provided continuous narrow side-rails 18 and 19 projecting only slightly on both sides. The side-rails 18 and 19 ensure that a middle zone of the steel band 3 remains entirely free from contact with other elements of the position measuring apparatus. The material for the side-rails 18 and 19 is chosen so as to minimize the coefficient of friction with respect to the steel band 3.

Outside the zone of the scanning component 2, the steel band 3 is secured with sealing effect by magnetic strips 5 and 6 which are arranged continuously along the upper surface of the carrier body 1. On the surface of the steel band 3 facing the scanning component 2, there is applied a series of incident light grid divisions 7 which consist of alternating light-reflecting and light-absorbing surface zones. In this way, the flexible steel band 3 serves as the carrier of the grid divisions 7 as well as the covering for the sensitive parts of the measurement system. The grid divisions 7 are provided in a zone about in the middle of the steel band 3 such that the grid divisions 7 are not damaged by contact with other elements of the measurement system.

In a recess 8 of the scanning component 2, there are accomodated a lamp 9, a condenser lens 10, a grid scanning plate 11, and photo-electric elements 12. These elements comprise an incremental incident light measuring system which is well-known in the art and, accordingly, requires no further explanation.

A coupling member 13 is mounted upon the scanning component 2 by laterally extending screws, as shown. The coupling member 13 acts as a hold-down member and guide for the steel band 3 and, for this purpose, includes rounded end portions 16 adjacent the upper surface of the magnetic strips 5 and 6. A soft strip 17 of rubber, plastic, felt, or similar material is mounted on the underside of the coupling member 13 to ensure that the steel band 3 is aligned parallel to the grid scanning plate 11.

On the underside of the scanning component 2, there are provided soft strips 14 and 15 of rubber, plastic, felt, or similar material to effect sealing between the scanning component 2 and the carrier body 1. In this manner, the grid divisions 7 and the elements within the recess 8 are protected from dust and spray in the zone of the scanning component 2. Alternatively, the scanning component 2 may be supported with sealing effect directly on the magnetic strips 5 and 6 without the intermediate soft strips 14 and 15.

In operation, the grid divisions 7, condenser lens 10, grid scanning plate 11, photo-electric elements 12, and dovetail of the scanning component 2 are constantly protected from environmental influences such as dust and spray by the covering band 3. It will be seen that the scanning component 2 lifts the covering band 3 from the carrier body 1 by a wedge-like action and then returns the covering band to the carrier body after sensing the grid divisions on the covering band 3. The rounded portions 16 of the coupling member 13 cooperate with adjacent surfaces of the scanning component 2 to effect squeegee-like removal of dust, spray, or liquid accumulated on the covering band 3 as the covering band is lifted from the carrier body.

It is to be understood that the invention is not limited in its application to the details of construction and arrangement of parts illustrated in the accompanying drawings, since the invention is capable of other embodiments and of being practiced or carried out in various ways. For example, in place of the steel band 3, a covering band made of plastic foil or other flexible material of high length-constancy may be used. In such embodiments, the covering band may be held against the carrier body by tension on the ends of the covering band by known means to bring about sealing. As in the preferred embodiment previously described, the covering band slides over a curved surface of the scanning component to protect portions of the measuring apparatus.

Figure 4:
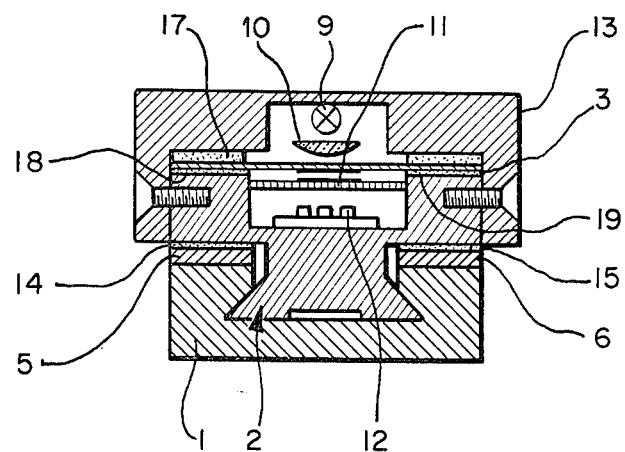
FIG. 4 is a sectional view corresponding to FIG. 2 of a second preferred embodiment of this invention.

The invention is also applicable in photo-electric incident light measurement systems in which the source of the illumination is located outside the encapsulated portion of the apparatus, as shown in FIG. 4. In that form of the invention, the grid divisions are applied to a transparent flexible covering band of high length-constancy. The light source is positioned on the coupling member instead of within a recess of the scanning component. Alternatively, the flexible covering band may comprise three flexible strips of which the laterally outer strips are steel bands while the middle strip is of transparent material and carries the grid divisions. In this variation of the invention, as in the preferred embodiment illustrated, the outer strips of the covering band can be secured with sealing effect by means of two continuous magnetic strips.

Figure 5:
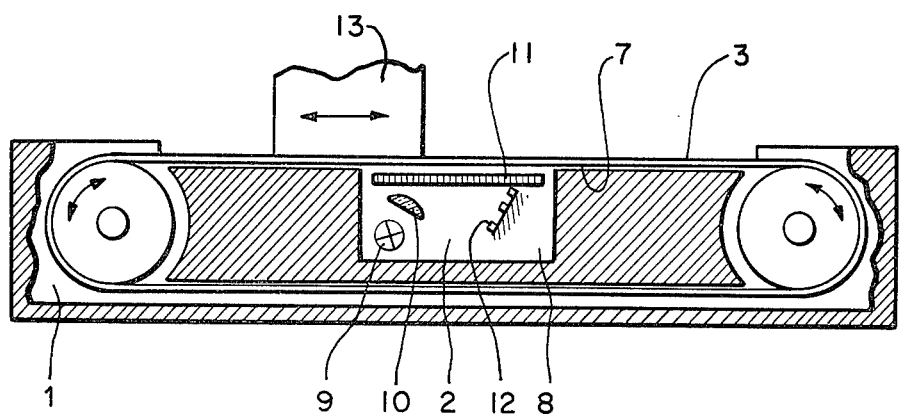
FIG. 5 is a sectional view of a third preferred embodiment of this invention.

A further application of the present invention is in position measurement systems which include a circulating flexible covering band, as shown in FIG. 5. In that application, the scanning component is in a fixed position within the hollow carrier body. The carrier body includes longitudinal grooves in which the flexible covering band is guided and circulates. The grid divisions are applied on the side of the covering band facing the scanning component. A coupling member is fastened to the outside of the covering band to facilitate movement thereof.

It will be seen from the foregoing description of the preferred embodiments that the present invention provides an encapsulated digital electric position measuring apparatus having a simple and economical construction as well as wide versatility. While the preferred embodiments have been described in considerable detail, the present invention is not to be limited to such detail. It is the following claims, including all equivalents, which are intended to define the scope of this invention.

I claim:

1. An encapsulated electric position measuring apparatus comprising:
   a carrier body;
   a flexible covering band supported in place by the carrier body and lying longitudinally on said carrier body in sealing contact therewith, said band adapted to conform to said carrier body to seal portions of the carrier body from environmental influences, said band defining a measuring scale;

a scanning component adapted to move along the band, at least a portion of said scanning component being disposed between the band and the carrier body to scan the measuring scale; and means for holding the band in position with respect to the carrier body and the scanning component such that said band, carrier body, and scanning component cooperate simultaneously to form a seal against dust and spray in order to protect said portions of the carrier body and the scanning component from environmental influences, and to protect the entire measuring scale at one side of the band from environmental influences throughout the range of travel between the scanning component and the band.

2. A measuring apparatus as defined in claim 1 wherein said covering band comprises a flexible steel band and wherein said measuring scale is upon the surface thereof facing said scanning component.

3. A measuring apparatus as defined in claim 2 wherein said holding means comprises means for securing said steel band to portions of said carrier body by magnetic action.

4. A measuring apparatus as defined in claim 3, wherein:
said scanning component is guided on said carrier body;
said carrier body is rigid;
said scanning component includes a surface, curved at least in sections, projecting from said carrier body;
said steel band slides over said scanning component surface; and
said holding means comprises means for securing said steel band with sealing effect outside the region of said scanning component by means of continuous magnetic strips provided laterally on said carrier body.

5. A measuring apparatus as defined in claim 4 wherein said measuring scale is applied in a rigid zone at about the middle of the steel band and wherein said steel band is in contact with said magnetic strips as well as said curved surface sections of the scanning component only outside said zone.

6. A measuring apparatus as defined in claim 1, wherein said covering band comprises a flexible transparent band of high length-constancy and wherein said measuring scale is on said transparent band.

7. A measuring apparatus as defined in claim 1 wherein said covering band comprises three cohesive flexible strips, of which the laterally outer strips are flexible steel bands held with sealing effect by magnets on said carrier body, and of which the middle flexible strip is transparent and includes said measuring scale on the surface facing said scanning component.

8. A measuring apparatus as defined in claim 6 or claim 7 which further comprises a coupling member mounted upon said scanning component and adapted to couple the scanning unit to an object, the position of which is to be measured, and a light source for said grid divisions mounted upon said coupling member on a side of the band opposed to the measuring scale.

9. A measuring apparatus as defined in claim 1 wherein said covering band comprises a flexible plastic band of high length-constancy which is held in position by tension and wherein said measuring scale is on the surface of said covering band facing said scanning component.

10. A measuring apparatus as defined in claim 1 wherein said covering band comprises an endless flexible covering band which is movable with respect to said carrier body and wherein said measuring scale is on the surface of said covering band facing said scanning component.

11. A measuring apparatus as defined in claim 10 which further comprises a coupling member secured to said covering band and adapted to couple the band to an object, the position of which is to be measured, and wherein said scanning component is fixedly mounted within said carrier body and said carrier body includes guide grooves for said covering band, said covering band being slidable relative to said scanning component such that movement of the coupling member causes the band to move with respect to the scanning component.

12. An encapsulated digital electric position measuring apparatus comprising:
an elongated carrier body having longitudinal guide means;
a steel covering band supported in place by the carrier body and held in sealing contact with said carrier body by magnetic action to seal and protect said guide means against dust and spray;
a scanning component guided by said guide means and slidable between said covering band and said carrier body so as to lift said covering band from said carrier body for scanning;
grid divisions on the surface of said covering band facing said scanning component detectable by said scanning component; and
a coupling member mounted upon said scanning component and adapted to couple the scanning component to an object, the position of which is to be measured, said coupling member cooperating with the scanning component to bring said covering band into position adjacent to said carrier body and to form a protective seal about portions of said scanning component against dust and spray.

* * * * *

UNITED STATES PATENT AND TRADEMARK OFFICE
CERTIFICATE OF CORRECTION

PATENT NO. : 4,477,726
DATED : October 16, 1984
INVENTOR(S) : Alfred Reichl

It is certified that error appears in the above-identified patent and that said Letters Patent is hereby corrected as shown below:

On the title page;

Line 2, please delete inventor's last name "Reichi", and substitute therefor --Reichl--.

Line 6, please delete inventor's last name "Reichi", and sustitute therefor --Reichl--.

IN THE CLAIMS

Column 5, Line 42, Claim 5, please delete "rigid".

Signed and Sealed this

Sixth Day of August 1985

[SEAL]

Attest:

DONALD J. QUIGG

Attesting Officer     Acting Commissioner of Patents and Trademarks